(12) United States Patent
Fan et al.

(10) Patent No.: US 10,746,916 B2
(45) Date of Patent: Aug. 18, 2020

(54) BACKLIGHT MODULE AND LCD DEVICE

(71) Applicant: Huizhou China Star Optoelectronics Technology Co., Ltd., Huizhou (CN)

(72) Inventors: Yong Fan, Huizhou (CN); Yuchun Hsiao, Huizhou (CN)

(73) Assignee: HUIZHOU CHINA STAR OPTOELECTRONICS TECHNOLOGY CO., LTD., Huizhou, Guangdong (CN)

(*) Notice: Subject to any disclaimer, the term of this patent is extended or adjusted under 35 U.S.C. 154(b) by 31 days.

(21) Appl. No.: 16/300,925

(22) PCT Filed: Sep. 14, 2018

(86) PCT No.: PCT/CN2018/105619
§ 371 (c)(1),
(2) Date: Nov. 12, 2018

(87) PCT Pub. No.: WO2019/210637
PCT Pub. Date: Nov. 7, 2019

(65) Prior Publication Data
US 2019/0339442 A1   Nov. 7, 2019

(30) Foreign Application Priority Data
May 2, 2018   (CN) .......................... 2018 1 0411268

(51) Int. Cl.
G02F 1/13357   (2006.01)
F21V 8/00   (2006.01)
(52) U.S. Cl.
CPC ........... *G02B 6/0073* (2013.01); *G02B 6/003* (2013.01); *G02B 6/0055* (2013.01); *G02F 1/1336* (2013.01)

(58) Field of Classification Search
CPC .... G02B 6/003; G02B 6/0055; G02B 6/0073; G02F 1/1336
See application file for complete search history.

(56) References Cited

U.S. PATENT DOCUMENTS 6,481,130 B1 *  11/2002  Wu .......................... F21V 13/04
                                                        362/297
10,295,147 B2 *  5/2019  Yuan ........................ F21K 9/00
(Continued)

FOREIGN PATENT DOCUMENTS

CN     101430072 A    5/2009
CN     201462486 U    5/2010
(Continued)

OTHER PUBLICATIONS

Machine Translation of JP 2002-118377 (Year: 2002).*

*Primary Examiner* — Leah Simone Macchiarolo
(74) *Attorney, Agent, or Firm* — Leong C. Lei

(57) ABSTRACT

The present invention teaches a backlight module and the LCD device. The backlight module includes a light guide plate and a light source located at a distance to a side of the light guide plate. The light source includes a substrate, multiple LED chips disposed on the substrate, multiple primary lenses disposed on the substrate corresponding to the LED chips, and multiple condenser lenses disposed on the substrate corresponding to the primary lenses. Each primary lens is disposed correspondingly to a LED chip, focuses light from the LED chip, and prevents the light emission face of the LED chip from being higher above the light guide plate, thereby enhancing the light coupling efficiency and reducing leakage of the backlight module. Each condenser lens is disposed correspondingly to a primary lens to further narrow light emission angle of the LED chip, enhancing light utilization efficiency.

14 Claims, 2 Drawing Sheets

(56) References Cited

U.S. PATENT DOCUMENTS

| | | | | |
|---|---|---|---|---|
| 2004/0207999 | A1* | 10/2004 | Suehiro | G02B 6/0018 362/84 |
| 2004/0218390 | A1* | 11/2004 | Holman | G02B 5/045 362/245 |
| 2005/0259441 | A1* | 11/2005 | Arai | G02B 6/0028 362/613 |
| 2006/0066218 | A1* | 3/2006 | Yamaguchi | G02B 19/0066 313/498 |
| 2006/0139580 | A1* | 6/2006 | Conner | G02B 27/0994 353/98 |
| 2006/0139918 | A1* | 6/2006 | Dolgin | G02B 3/00 362/232 |
| 2009/0297090 | A1* | 12/2009 | Bogner | G02B 6/0018 385/14 |
| 2010/0059767 | A1* | 3/2010 | Kawasaki | G02B 6/0096 257/89 |
| 2013/0320878 | A1* | 12/2013 | Tien | G02B 6/0028 315/291 |
| 2014/0218625 | A1* | 8/2014 | Kuromizu | H04N 5/66 348/790 |
| 2016/0003997 | A1* | 1/2016 | Ouderkirk | G02B 6/0028 362/606 |
| 2016/0047966 | A1* | 2/2016 | Schenkl | F25D 27/00 362/606 |
| 2016/0312977 | A1 | 10/2016 | Jiang et al. | |
| 2016/0320048 | A1* | 11/2016 | Daniels | A63G 31/00 |
| 2019/0011088 | A1* | 1/2019 | Kim | F21V 7/04 |

FOREIGN PATENT DOCUMENTS

| | | | |
|---|---|---|---|
| CN | 102324453 | A | 1/2012 |
| CN | 202332845 | U | 7/2012 |
| CN | 203298083 | U | 11/2013 |
| CN | 203309590 | U | 11/2013 |
| CN | 103620804 | A | 3/2014 |
| CN | 103851410 | A | 6/2014 |
| CN | 204285158 | U | 4/2015 |
| CN | 104930397 | A | 9/2015 |
| CN | 105717704 | A | 6/2016 |
| JP | 2002118377 | A * | 4/2002 |

* cited by examiner

BACKLIGHT MODULE AND LCD DEVICE

FIELD OF THE INVENTION

The present invention is generally related to the field of display technology, and more particularly to a backlight module and a liquid crystal display (LCD) device.

BACKGROUND OF THE INVENTION

Thin film transistors (TFTs) are the major driving components in existing LCD devices and active matrix organic light-emitting diode (AMOLED) devices. TFTs directly affect the performance of these devices.

Existing LCD devices are usually back-lighted display devices, and include a LCD panel and a backlight module. The principle behind a LCD panel is to fill liquid crystal molecules between a TFT array substrate and a color filter (CF) substrate, and to alter the alignment of the liquid crystal molecules by the electrical field formed between the substrates as the substrates are applied with pixel and common voltages. As such, light from the backlight module is refracted to produce images.

Ultra-thin LCD devices are currently the mainstream product, and there are already LCD panels having thickness 5.9 mm and 9 mm. To support these LCD panels, their light guide plate (LGP) also should have reduced thickness. Existing LGPs already have their thickness reduced from previous 3 mm to below 2 mm. Their material is also switched from polymethyl methacrylate (PMMA) to glasses. It is expected that, in the future, glass-LGP would have thickness lower than 1 mm. As LGPs are becoming thinner, the width of light-emitting diodes (LEDs) also has to be thinner. Previously most LEDs has thickness 2.0 mm or 1.6 mm, but these days most of them have thickness 1.4 mm or 1.0 mm. When these LEDs are inserted unto printed circuit boards (PCBs), due to the precision of the workstation, some LEDs are not aligned and some have their light emission face above the LGP, causing severe light leakage. The backlight module therefore suffers low light coupling efficiency and low power utilization. On the other hand, the number of configured LEDs is also limited due to the dimension of their lead frames. The driving power to each LED is also limited by the lead frame's light fastness and heat resistance properties.

SUMMARY OF THE INVENTION

An objective of the present invention is to provide a backlight module having high light coupling efficiency, low light leakage, and enhanced light utilization efficiency.

Another objective of the present invention is to provide a liquid crystal display (LCD) device having high light coupling efficiency, low light leakage, and enhanced light utilization efficiency.

To achieve the objectives, the backlight module includes a light guide plate and a light source located at a distance to a side of the light guide plate. The light source includes a substrate, multiple LED chips disposed on the substrate, multiple primary lenses disposed on the substrate corresponding to the LED chips, and multiple condenser lenses disposed on the substrate corresponding to the primary lenses.

The substrate is a metal core printed circuit board (MCPCB). The multiple LED chips are affixed to the MCPCB by an ultrasonic eutectic process.

The primary lenses and the condenser lenses are formed through an injection molding process.

Injection gates are configured on the substrate where the primary and condenser lenses are located.

The backlight module further includes multiple blocks disposed between the light source and the light guide plate.

The backlight module further includes a reflection sheet beneath the light guide plate and the light source.

The light source further includes an insulation layer disposed on the substrate, a reflection layer disposed on the insulation layer, and a protection layer disposed on the reflection layer. Each stack of an LED chip, a primary lens, and a condenser lens directly contacts the substrate through a via penetrating the insulation layer, the reflection layer, and the protection layer.

The reflection layer is made of silver, and the protection layer is made of SiO. The reflection layer has a thickness greater than 10 mm, and the protection layer has a thickness between 160 and 180 nm.

The primary lenses are made of fluoride organic resin having a refractive index less than 1.45, and the condenser lenses are made of silicone resin or glasses having a refractive index greater than 1.48.

The present invention also teaches a LCD device, which includes a LCD panel and a backlight module as described above disposed behind the LCD panel.

The advantages of the present invention are as follows. The backlight module includes a light guide plate and a light source located at a distance to a side of the light guide plate. The light source includes a substrate, multiple LED chips disposed on the substrate, multiple primary lenses disposed on the substrate corresponding to the LED chips, and multiple condenser lenses disposed on the substrate corresponding to the primary lenses. Each primary lens is disposed correspondingly to a LED chip, focuses light from the LED chip, and prevents the light emission face of the LED chip from being higher above the light guide plate, thereby enhancing the light coupling efficiency and reducing leakage of the backlight module. Each condenser lens is disposed correspondingly to a primary lens to further narrow light emission angle of the LED chip, enhancing light utilization efficiency. The LCD device therefore has high light coupling efficiency, low light leakage, and enhanced light utilization efficiency.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

The following descriptions for the respective embodiments are specific embodiments capable of being implemented for illustrations of the present invention with referring to appended figures.

Figure 1:
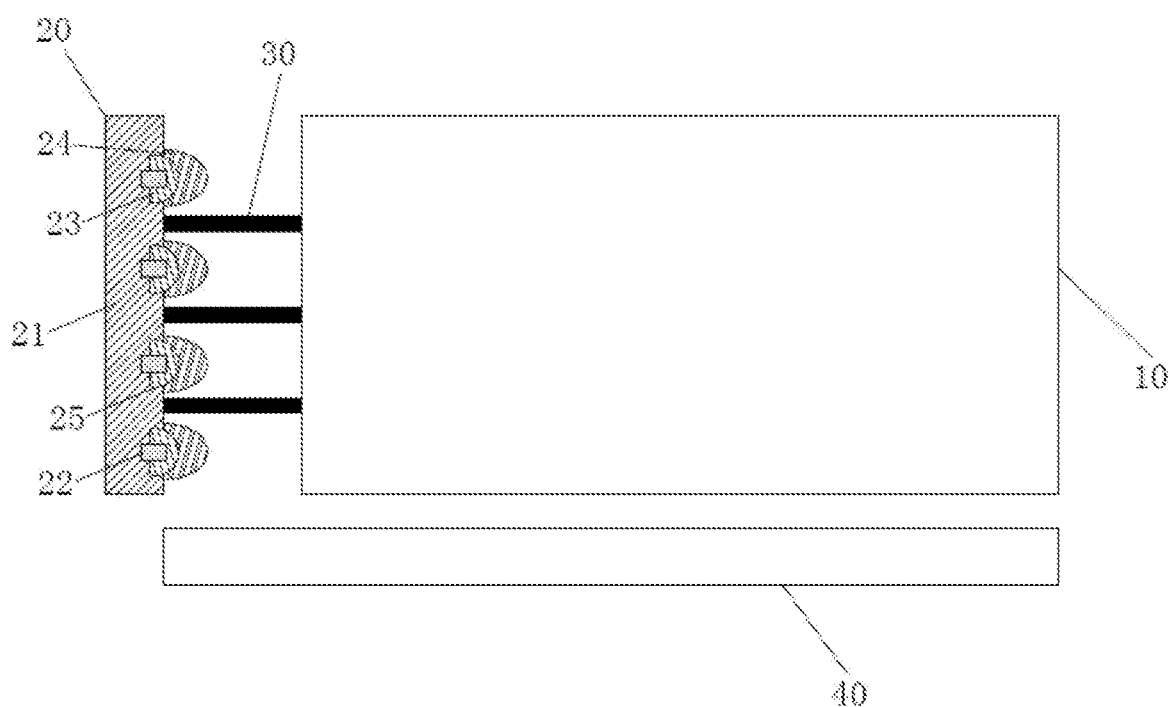
FIG. 1 is a schematic structural diagram showing a backlight module according to an embodiment of the present invention.

As shown in FIG. 1, a backlight module according to an embodiment of the present invention includes a light guide plate 10, and a light source 20 located at a distance to a side of the light guide plate 10. The light source 20 includes a substrate 21, multiple LED chips 22 disposed on the substrate 21, multiple primary lenses 23 disposed on the substrate 21 corresponding to the LED chips 22, and multiple condenser lenses 24 disposed on the substrate 21 corresponding to the primary lenses 23.

It should be noted that, for the multiple primary lenses 23 corresponding to the multiple LED chips 22, each primary lens 23 is disposed correspondingly to a LED chip 22, focuses light from the LED chip 22, and prevents the light emission face of the LED chip 22 from being higher above the light guide plate 10, thereby enhancing the light coupling efficiency and reducing leakage of the backlight module. Each condenser lenses 24 is disposed correspondingly to a primary lens 23 to further narrow light emission angle of the LED chip 22, enhancing light utilization efficiency.

Specifically, the primary lenses 23 are made of fluoride organic resin having a refractive index less than 1.45 that is both high-temperature and blue-ray resistant.

Specifically, the condenser lenses 24 are made of silicone resin or glasses having a refractive index greater than 1.48 that is both high-temperature and blue-ray resistant.

Specifically, the substrate 21 is a metal core printed circuit board (MCPCB). The multiple LED chips 22 are affixed to the MCPCB by an ultrasonic eutectic process. As MCPCB has low thermal resistance and superior heat dissipation, more LED chips 22 may be disposed on the substrate 21 than those allowed by the prior art as the substrate 21 is more robust to heat. The driving power to the LED chips 22 will also not be constrained by the substrate 21's capability in withstanding heat, and therefore may increase the brightness of the light source 20.

Specifically, the primary lenses 23 and the condenser lenses 24 are formed through an injection molding process.

Furthermore, to prevent rugged gates formed on the primary and condenser lenses 23 and 24 by the injection molding process, to avoid affecting the lighting of the primary and condenser lenses 23 and 24, and to keep the primary and condenser lenses 23 and 24 from being pulled out during mold releasing, injection gates 25 are configured on the substrate 21 where the primary and condenser lenses 23 and 24 are located.

Specifically, the LED chips 22 are connected to the substrate 21 through wire bonding.

Specifically, the backlight module also includes multiple blocks 30 disposed between the light source 20 and the light guide plate 10, preventing the light guide plate 10 from impacting and damaging the primary and condenser lenses 23 and 24, and guaranteeing a specific distance between the lenses and the light guide plate 10. Furthermore, the LED chip 22 and the primary lenses 23 are formed in an integral process after bonding wires are configured on the substrate 21 and the multiple buffer elements 30 are configured between the light source 20 and the light guide plate 10.

Specifically, the backlight module further includes a reflection sheet 40 beneath the light guide plate 10 and the light source 20. The reflection sheet 40 reflects the light leaked from the bottom back to the light guide plate 10, thereby enhancing the light utilization efficiency.

Figure 2:
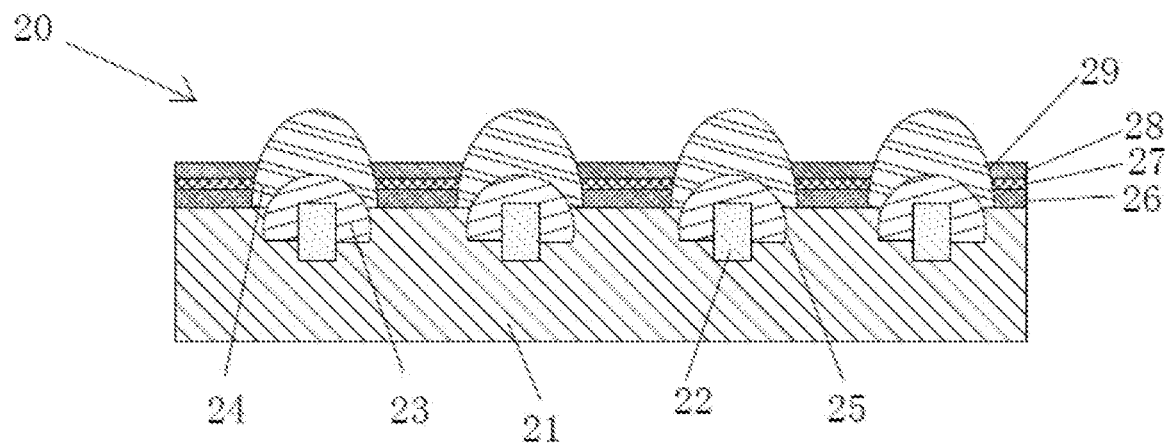
FIG. 2 is a schematic structural diagram showing a light source of the backlight module of FIG. 1.

Specifically, as shown in FIG. 2, the light source 20 further includes an insulation layer 26 disposed on the substrate 21, a reflection layer 27 disposed on the insulation layer 26, and a protection layer 28 disposed on the reflection layer 27. A stack of an LED chip 22, a primary lens 23, and a condenser lens 24 directly contacts the substrate 21 through a via 29 penetrating the insulation layer 26, the reflection layer 27, and the protection layer 28. By having the reflection layer 27 disposed on the substrate 21, the emitted light reflected to the substrate 21 is reflected back into the light guide plate 10, thereby fully utilizing the emitted light, reducing light leakage, and enhancing light utilization efficiency.

Specifically, the reflection layer 27 is made of silver, and the protection layer 28 is made of SiO.

Furthermore, the reflection layer 23 has a thickness greater than 10 mm, so that the light reflection effect of the reflection layer 27 is guaranteed. The protection layer 28 has a thickness between 160 and 180 nm.

The present invention also teaches a LCD device, which includes a LCD panel and a backlight module as described above disposed behind the LCD panel.

As described above, the backlight module includes a light guide plate and a light source located at a distance to a side of the light guide plate. The light source includes a substrate, multiple LED chips disposed on the substrate, multiple primary lenses disposed on the substrate corresponding to the LED chips, and multiple condenser lenses disposed on the substrate corresponding to the primary lenses. Each primary lens is disposed correspondingly to a LED chip, focuses light from the LED chip, and prevents the light emission face of the LED chip from being higher above the light guide plate, thereby enhancing the light coupling efficiency and reducing leakage of the backlight module. Each condenser lens is disposed correspondingly to a primary lens to further narrow light emission angle of the LED chip, enhancing light utilization efficiency. The LCD device therefore has advantages of high light coupling efficiency, low light leakage, and enhanced light utilization efficiency.

Above are embodiments of the present invention, which does not limit the scope of the present invention. Any equivalent amendments within the spirit and principles of the embodiment described above should be covered by the protected scope of the invention.

What is claimed is:

1. A backlight module, comprising a light guide plate and a light source located at a distance to a side of the light guide plate, wherein the light source comprises a substrate, a plurality of LED chips, a plurality of primary lenses, a plurality of condenser lenses, an insulation layer disposed on the substrate, a reflection layer disposed on the insulation layer, and a protection layer disposed on the reflection layer;

a plurality of vias penetrates the insulation layer, the reflection layer, and the protection layer;

the substrate comprises a plurality of injection gates along a side of the substrate;

the LED chips are respectively disposed in the injection gates and vias, and contact with the substrate;

the primary lenses are respectively disposed in the injection gates and vias on the LED chips inside, and contact with the substrate; and the condenser lenses are respectively disposed in the vias on the primary lenses inside, and contact with the substrate.

2. The backlight module according to claim 1, wherein the substrate is a metal core printed circuit board (MCPCB); and the LED chips are affixed to the MCPCB by an ultrasonic eutectic process.

3. The backlight module according to claim 1, wherein the primary lenses and the condenser lenses are formed through an injection molding process.

4. The backlight module according to claim 1, further comprising a plurality of blocks disposed between the light source and the light guide plate.

5. The backlight module according to claim 1, further comprising a reflection sheet beneath the light guide plate and the light source.

6. The backlight module according to claim 1, wherein the reflection layer is made of silver; the protection layer is made of SiO; the reflection layer has a thickness greater than 10 mm; and the protection layer has a thickness between 160 and 180 nm.

7. The backlight module according to claim 1, wherein the primary lenses are made of fluoride organic resin having a refractive index less than 1.45; and the condenser lenses are made of silicone resin or glasses having a refractive index greater than 1.48.

8. A liquid crystal display (LCD) device, comprising a LCD panel and a backlight module as claimed as claim 1 behind the LCD panel.

9. The LCD device according to claim 8, wherein the substrate is a metal core printed circuit board (MCPCB); and the LED chips are affixed to the MCPCB by an ultrasonic eutectic process.

10. The LCD device according to claim 8, wherein the primary lenses and the condenser lenses are formed through an injection molding process.

11. The LCD device according to claim 8, wherein the backlight module further comprises a plurality of blocks disposed between the light source and the light guide plate.

12. The LCD device according to claim 8, wherein the backlight module further comprises a reflection sheet beneath the light guide plate and the light source.

13. The LCD device according to claim 8, wherein the reflection layer is made of silver; the protection layer is made of SiO; the reflection layer has a thickness greater than 10 mm; and the protection layer has a thickness between 160 and 180 nm.

14. The LCD device according to claim 8, wherein the primary lenses are made of fluoride organic resin having a refractive index less than 1.45; and the condenser lenses are made of silicone resin or glasses having a refractive index greater than 1.48.

* * * * *